United States Patent [19]

Nelson

[11] Patent Number: 4,769,915

[45] Date of Patent: Sep. 13, 1988

[54] RANDOM ACCESS IMAGE RETRIEVAL APPARATUS

[76] Inventor: John C. Nelson, 4013 Linden St., Oakland, Calif. 94608

[21] Appl. No.: 11,605

[22] Filed: Feb. 6, 1987

[51] Int. Cl.⁴ ............................................. G03B 23/00
[52] U.S. Cl. ...................................... 353/25; 353/110
[58] Field of Search ............... 353/110, 120, 25, 27 R, 353/27 A, 108, 121, 122

[56] References Cited

U.S. PATENT DOCUMENTS 3,421,802  1/1969  Irazoqui ........................... 353/110 X
4,132,469  1/1979  Harvey .................................. 353/25

OTHER PUBLICATIONS

Research Disclosure 2/82 #21439 "Microimage image storage" Ferguson et al.

Primary Examiner—Harry N. Harian
Attorney, Agent, or Firm—Frank L. Abbott

[57] ABSTRACT

A high-density rapid random - access retrieval apparatus for retrieving micrographic and data images stored on plural windowed discs. The apparatus is comprised of a disc/radial selection mechanism which moves axially of a cartridge containing a stack of closely spaced discs. Each disc has a clear window disposed on a radius thereof and a plurality of windows containing micrographic and/or data images disposed along other radii. When the disc/radial selection mechanism has moved to a selected disc, the radial component rotates the disc until the radius upon which the desired image is located is aligned with the clear windows in the other discs. The optical system includes lens and reflecting surfaces. At one end of the system is a projection means and at the other end lies its receiving means. Elements of the system are vertically adjustable so that the line of sight of the system is projected through any selected image bearing window. The optical system also includes a means for keeping all of the optical path lengths constant. The stack of discs is centrally supported and the discs are individually rotated by a disc/radial selection means which is mounted for linear motion to a position adjacent a selected disc. The disc may also be rotated by drive means which are positioned adjacent each discs and are selectively activated to rotate a selected discs to find position and a previously selected disc to file position.

17 Claims, 7 Drawing Sheets

FIG. 13
FIG. 14
FIG. 15
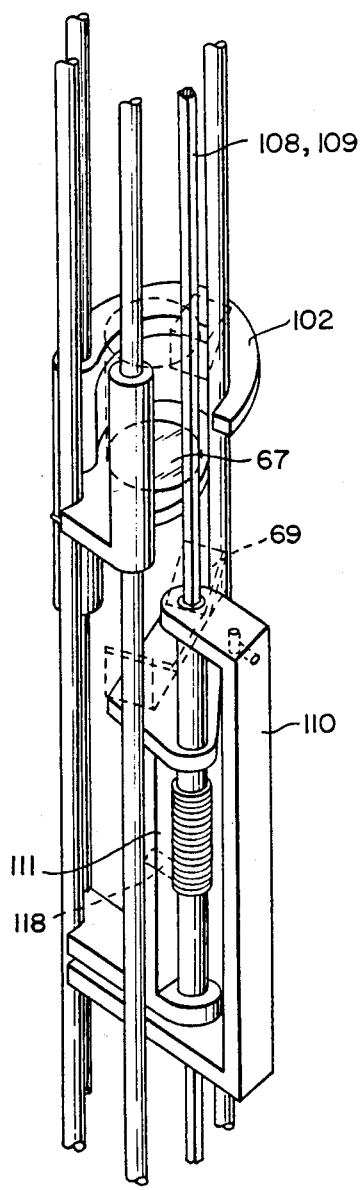
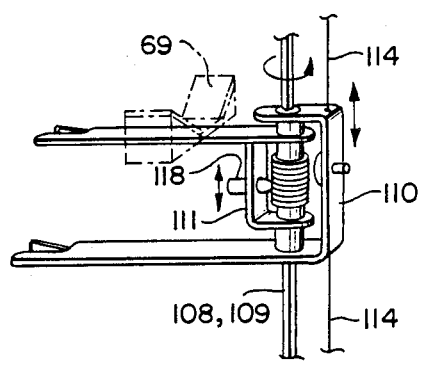
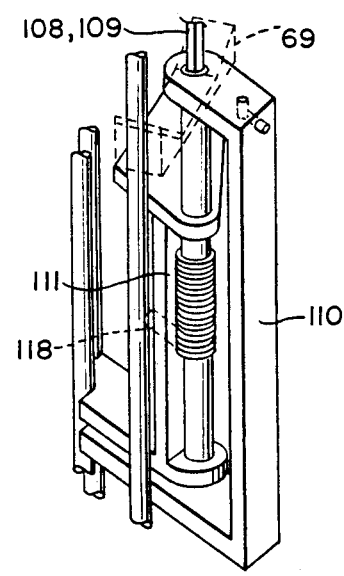

RANDOM ACCESS IMAGE RETRIEVAL APPARATUS

BACKGROUND OF THE INVENTION

The present invention relates to a novel basic concept for the rapid, random-access retrieval of micrographic and date images stored on plural windowed discs. The concept can be implemented to provide a variety of specific devices.

The term "windowed" disc refers to an optically clear area on each disc that characterizes this type of invention. The essential principle is that aligned clear windows in plural discs form a viewing column through which the stored information on any single unaligned disc may be seen.

The present invention shares some aspects of the windowed disc concept with prior art. Examples of the prior art are the U.S. Pat. Nos. 2,989,904 to Braggs et al; 3,421,802 to Irazoqui; 3,959,801 to Booth; 4,132,469 to Harvey and 3,975,745 to Pick. However, it differs greatly from the prior art in its general concept and the apparatus for implementing it.

The primary advantage of windowed disc devices over related disc devices reduces the amount of space utilized between the discs, which greatly affects the overall storage density of the device. Optical retrieval devices based on the principles of magnetic disk storage devices have no window and consequently must insert read heads between discs (Booth; Pick). Providing each disc with an optically clear window allows discs to be stored proximately.

Prior windowed disc devices may be divided into two groups depending on the function performed by the disc window. In one group, the viewing column formed by the aligned windows is used to allow passage of an optical head from one disc position to another (Braggs; Harvey). In this group, the disc windows must be open at the rim in order to allow lateral insertion of the optical head into the viewing column. In the second group, the viewing column is used to allow passage of the information-reading optical beam only, which is directed from the ends of the viewing column (Irazoqui). In this group the disc rim at the window location may be closed since no physical components are inserted into the viewing column. The present invention belongs to the latter group.

Two features of the present invention distinguish it from all other prior windowed disc art. First, it provides mechanisms that access discs containing plural concentric levels of images; all prior art windowed discs contain only a single ring of images.

Second, it provides mechanisms that address a plurality of object planes (disc positions) while maintaining a constant aerial image plane, thereby enabling retrieval with no relative motion between the disc stack, the chassis and the primary viewing element (lens, video pickup, change coupled device). Prior art devices either use a single object plane or fail to disclose means for achieving plural object planes.

The various prior art devices have additional problems which can be solved or alleviated by the present invention. For example, the present invention can:

record as well as play;
retrieve any image in 100,000 in ½ second;
store more than one type of information on the same storage medium, allowing both eye-readable and machine-readable playback from the same machine;
store multiple media types (black-and-white and color photo emulsions, eraseable laser-ablative optical data disc media) on the same disc or in the same cartridge, allowing retrieval of a wide range of information types from the same machine;
avoid loss of storage area due to peripherally-increasing bit size (as required in constant-velocity disc devices);
avoid loss of storage area due to on-medium servo guidance tracks or spaces (as required by micro bit size optical disc devices);
increase stack volume-density by storing discs contigously (as cited above);
increase stack volume-density by reducing the thickness of the discs using integral constructions of transparent substrates and emulsion rather than the multi-piece opaque substrate constructions used by prior art);
facilitate the placement and removal of discs in cartridges;
interface with any type of display or transmission equipment capable of utilizing an aerial image (ocular lens, projection lens, video pickup, CCD facsimile scanner, etc.);
avoid the coding of image location on the image medium (for example, micrographic "blip" coding);
operate under total computer control of its various electromechanical components (computer-driven rather than "computer-assisted-retrieval", CAR);
store unitized volumes of information far beyond the unit capacities of existing equipment (for example, beyond the 80-image limit of carousel slide projections, beyond the 200-foot roll film cartridge capacity of current CAR micrographic systems and beyond the 500 megabyte limit of magnetic disc drives);
access large volumes of information without manual operator intervention (for example, no roll film cartridge swapping, no exchanging of magnetic disc assemblies);
largely avoid "autofocus" adjustments by maintaining precise positioning of all discs at all times; can also use its existing optical adjustment system for autofocus purposes if needed.

There and other advantages of the present invention will become more apparent with consideration of the following description.

RELATED COPENDING APPLICATION

The subject matter included herein is related to and disclosed in part in Applicant's Copending application Ser. No. 637,584 filed Aug. 3, 1984, now U.S. Pat. No. 4,679,922.

SUMMARY OF THE INVENTION

The present invention provides a basic concept for the retrieval of information stored as images on substantially circular plural windowed discs. The images extend along the radii of each disc from the center to the perimeter. Each disc also has a clear window extending along a radius thereof, which aligns with the clear windows of the other discs to form a viewing column through which images on any unaligned disc may be seen.

The discs are removably stored in close proximity to each other in a cartridge. The selected cartridge is received by the chassis and remains stationary relative thereto. (The cartridge structure may also be fixed to and integral with the chassis.)

Selective retrieval of specific images takes place by optical projection from multiple object planes onto a single aerial image plane, (In optical terms, the information images stored on the discs are the objects of the invention's optical system.)

The electromechanical subsystems effect the optical routing of the information from object planes to aerial image plane: a disc/radial selection mechanism and an optical system.

The disc/radial selection mechanism moves axially relative to the cartridge to a position adjacent the selected disc, at which position the radial component becomes effective to rotate the disc to position the radius containing the selected image in alignment with the clear windows of the other discs.

The optical system, consisting of the necessary lens and reflective surfaces, has its projecting means at one end of the stack of discs and its image receiving means at the other end of the stack. The means are vertically adjustable by a system which is actuated to project the line of sight of the optical system through the selected image on the radius. Means are also provided to keep all optical pathlengths constant.

The various mechanisms and combinations set forth in this patent constitute various embodiments of a single novel retrieval concept capable of mass information storage, exceptionally high retrieval speed, and unique versatility in the types of information stored. The concept can be described in its most generalized form as follows: Optically-readable information is stored as densely as possible at discrete locations within a spatial volume. Each location has a unique coordinate identity, x-y-z. Each location can be accessed in its three spatial dimensions simultaneously. By electromechanically setting three distinct positions, x,y, and z, a unique optical path is provided to any selected image. The three spatial dimensions of the invention method are called, (1) disc selection (z), (2) radial selection (x), and (3) level selection (y).

Pivotal to this novel concept for image retrieval is the manner in which information is formated. At the present time, standard micrographic image retrieval is practiced using only two formats: linear (roll film) and rectangular matrix (fiche). Matrix format has an obvious advantage in that simultaneous x-y positioning of a ten-by-ten arrangement of images can occur in the time it takes for only ten images in linear format to be moved. That is, the two-dimensional matrix format has an inherent square-root (10:100) retrieval time advantage over linear format. Since the present invention method can access in three dimensions simultaneously, x-y-z, it is clear that information formated radially in multiple concentric levels on windowed discs has an inherent cube-root (10:1,000) retrieval time advantage over linear format, owing intrisically to the windowed disc format itself. It is therefore believed that the windowed disc format of this invention method will become a standard micrographic format.

BRIEF DESCRIPTION OF THE DRAWINGS

Further objects and advantages of the invention will become apparent from the following description and claims, and from the accompanying drawings, wherein:

FIGS. 13, 14, 15, 16 and 17 illustrate in more detail the basic optical adjustment system for use within the scope of the invention; FIG. 16 being a part sectional view of FIG. 15.

DESCRIPTION OF PREFERRED EMBODIMENT

Figure 1:
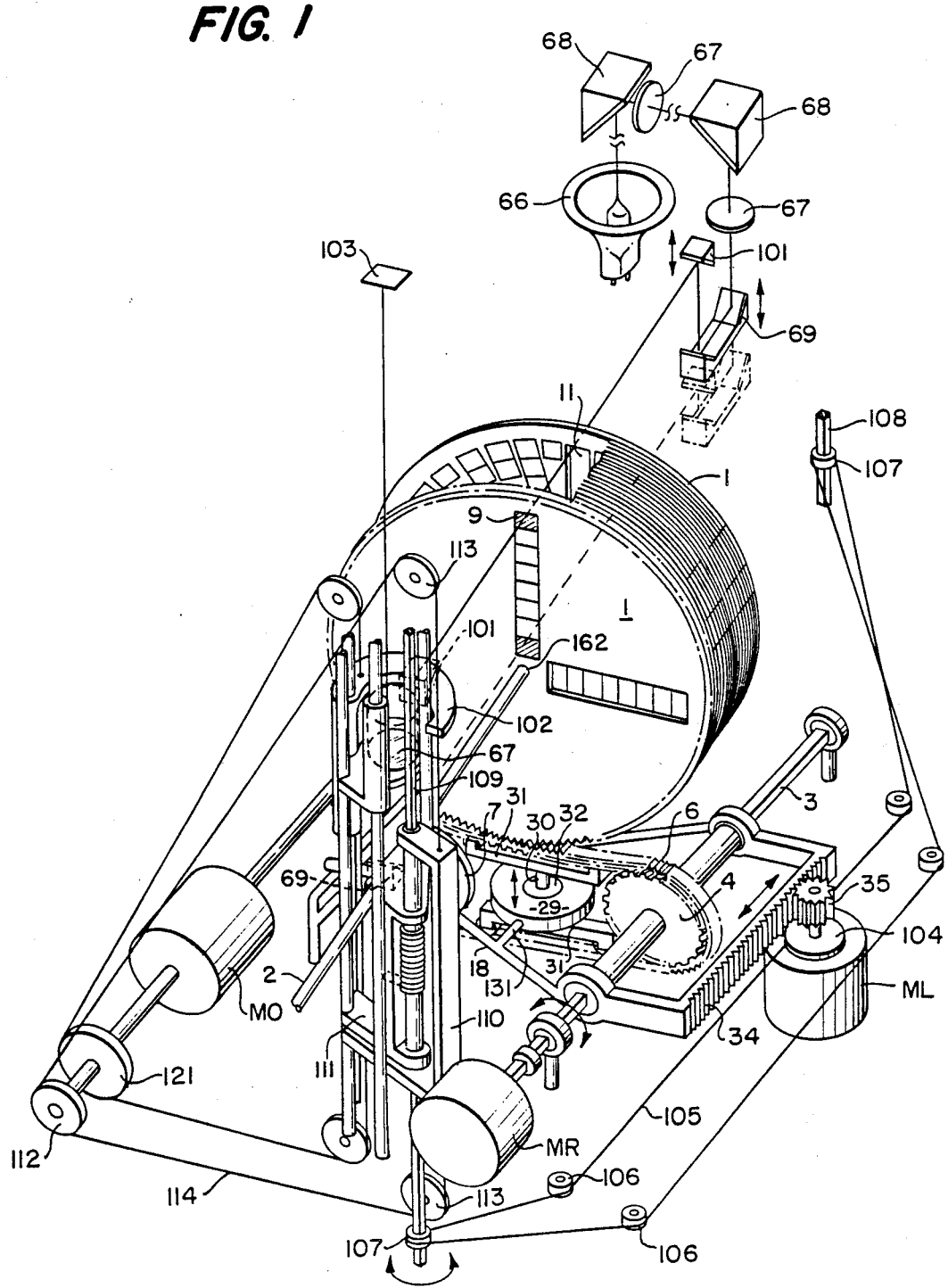
FIG. 1 is a detailed view of a center support/perimeter drive embodiment of the retrieval system.

FIG. 1 illustrates a preferred embodiment. As explained above, it is of center support/perimeter drive configuration.

As explained in the Summary, the present invention method uses three degrees of motion—x, y and z—to access selected images, and auxiliary motions to maintain constant optical pathlengths. Motions z and x are implemented by the disc/radial selection mechanism, while the remaining motions are considered as part of the optical system.

In FIG. 1 a shaft 2 is illustrated rotatably supporting a stack of windowed discs 1. The shaft 2 is supported at its ends by support means (not shown). This rotatable support of the discs 1 by shaft 2 permits the disc/radial selection mechanism to rotate selected discs individually to a find or file position. The disc/radial selection mechanism is a combination linear/rotational device, the embodiment illustrated in FIG. 1 is shown in greater detail in FIG. 12 and more specifically described in relation to that figure.

The linear component is comprised of a rack 34 driven by a pinion 35 mounted on the shaft of motor ML and associated support structures. Rotation of the pinion 35 slides the radial position selection component carried by the rack 34 support assembly axially along shaft 3 to a position adjacent the selected disc 1.

The rotational component comprises a drive pulley 4, an idler pulley 7, a belt 6 trained over said pulleys, a motor MR, a clutch mechanism 29 and associated supporting structures. Motor MR rotates the keyed shaft 3 thereby rotating the pulley 4 and driving the belt 6. The clutch mechanism is comprised of a shaft 30 connected to lifting means 32 which is supported from a member 18 by means 131. When the means 32 is activated the shaft 30 raises the upper run of the belt into engagement with the periphery of the selected disc 1 and the disc is rotated until the radius carrying the selected data image 9 moves into proper aligned position with the clear windows 11 in the other discs 1.

The optical system, shown in FIGS. 1, 13, 14, 15, 16 and 17 is comprised of an illumination or scanning device 66, lens 67, mirrors 68, paired mirrors 69, level select mirrors 101 and associated support and guide structures.

During the time that the disc/radial selection mechanism is finding and rotating the selected disc, the optical system simultaneously positions the level selection mirrors 101 so that the optical axis is at the correct height to intersect the selected image frame. The level selection mirrors 101 are mounted on level selection tables or carriages 102 (only one carriage being illustrated in FIG. 1) for vertical movement whereby the optical axis may be adjusted continuously or incrementally from a position substantially at the center of the discs 1 along a radius to a position substantially at the periphery of the discs by a pulley and cable arrangement driven by motor MO.

As the disc and level positions are moved, undesirable changes take place in the optical pathlengths. These changes are corrected by auxiliary means in the optical system called the pathlength compensation mechanism. The causes and effects of pathlength changes and the solution are described next.

When the level position (optical axis) is moved up by the level selection mirrors 101, the distance between the selected disc image and the lens lengthens, as does the distance between the selected image and the illumination source. When the disc position is moved toward the lens by the disc/radial selection mechanism, the distance between the selected disc image and the lens shortens, while the distance between the selected image and the source lengthens.

The effect of any change in the image-to-lens pathlength is to change the size of the primary aerial image 103 and its distance from the lens. In order to be readily utilized by display or transmission means, the aerial image must be kept constant in position and in size (unless zooming is intended, as indicated by the phantom lens position in FIG. 17).

The effect of any change in the image-to-source pathlength is to change the cross section of the source cone intersecting the accessed frame, effecting the brightness and evenness of illumination.

The pathlength compensation mechanism is designed to keep the primary aerial image constant in size and position, regardless of whether disc and level positions change independently or concurrently.

The pathlength compensation mechanism is quite similar to the disc/radial selection mechanism in what it is a combination linear/rotational device. The linear component is driven by and compensates for changes in level selection, while the rotational component is driven by and compensates for changes in disc selection.

Figure 16:
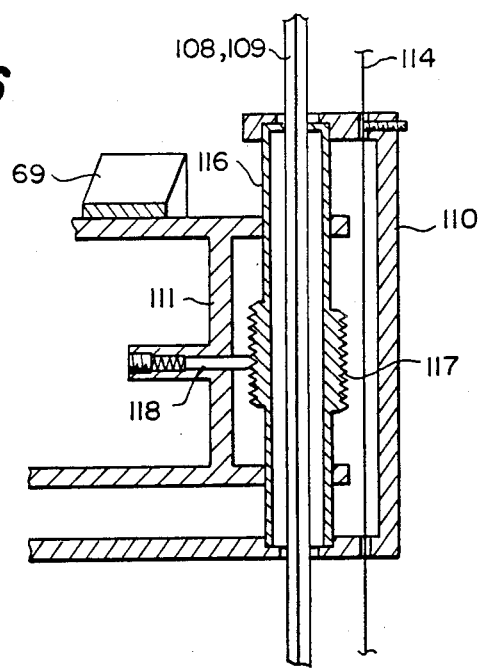
Figure 17:
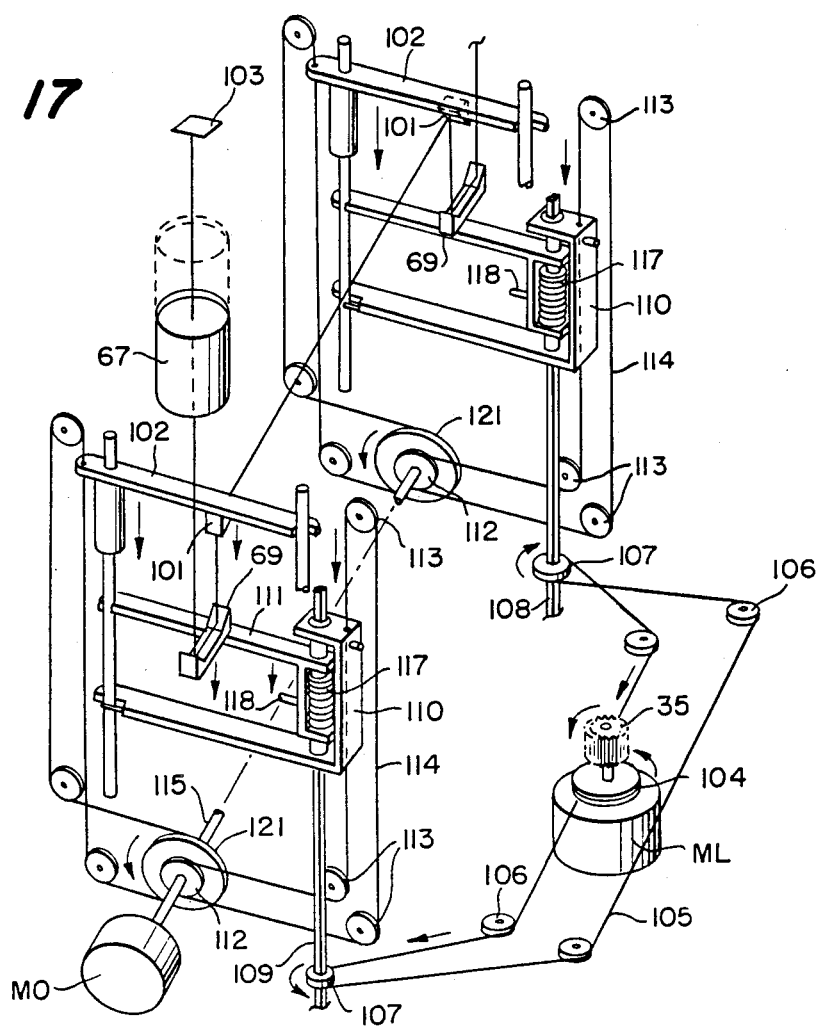

Both the linear disc selection motor ML and the level selection motor of the optical system MO have auxiliary linkages to two identical pathlength compensation linear/rotational devices located at either end of the disc stack, as shown in FIGS. 1 and 17. These linkages actuate the two double bracket assemblies, shown in greater detail in FIGS. 13, 14, 15 and 16.

The outer brackets 110 are the linear components and adjust the pathlength relative to level selection. As the shaft of motor MO rotates the level selection drive pulleys 121, it also rotates the auxiliary pulleys 112, thereby moving the double bracket assemblies in their entirety by means of cables 114 and idler pulleys 113. Referring to FIG. 17 (as expanded view of the compact assembly in FIG. 1), whenever the level selection mirrors descend, the double bracket assemblies slide down shafts 108 and 109, carrying the mirror pairs 69 with them and keeping the optical pathlengths constant. Because the mirror pairs 69 fold the path back on itself, the mirror pairs 69 need travel only half as far as the level selection mirrors 101; the auxiliary pulleys 112 are therefore only half the diameter of the level selection drive pulleys 121.

The inner brackets 111 are the rotational components and adjust the pathlength relative to disc selection. As the disc selection motor ML rotates its drive pinion 35, it also rotates auxiliary pulley 104, which rotates shafts 108 and 109 in opposite directions from one another by means of cables 105, idler pulleys 106 and shaft-mounted pulleys 107. Referring to FIG. 16 the keyed (noncircular in section) rotating shafts 108 and 109 raise and lower the inner brackets 111 relative to the outer brackets 110 by rotating the support tubes 116. As the helically threaded portion of the tubes 117 turn, they carry the engaged detents 118 and the inner brackets 111 axially. Again, because the optical path is folded back on itself by the mirror pairs 69, changes in disc position need be compensated only by half; the pitch of the helixes and the diameters of linkage pulleys are implemented accordingly. Since the total linear travel of the disc/radial selection mechanism is equal to the thickness of the stack, the length of travel of the inner brackets 111 and the length of the helical sections will be equal to half the thickness of the stack.

To recap the actions of the double bracket mechanism, again referring to FIG. 16, whenever the level position is changed, cables 114 slide the outer brackets 110 axially along keyed shafts 108 and 109, carrying the inner brackets 111 and mirror pairs 69 with them to compensating positions. Whenever the disc position is changed, the keyed shafts 108 and 109 rotate, sliding inner brackets 111 axially along support tubes 116 by means of helixes 117 and detents 118, carrying the mirror pairs 69 to compensating positions. When both level position and disc position are changed simultaneously, the outer and inner brackets move concurrently and independently.

The preferred embodiment just described can be viewed as a "general purpose" device meeting a wide variety of high-speed image retrieval needs.

Figure 2:
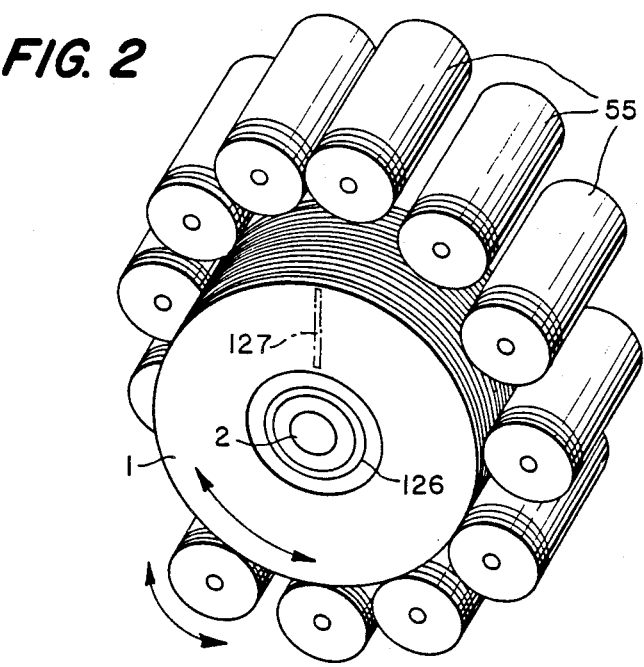
FIG. 2 illustrates a center support/perimeter drive mechanism, the drive mechanism being somewhat different from that of the embodiment illustrated in FIG. 1.

In FIG. 2 a motor per disc combination is disclosed. In this embodiment there is a separate motor 55 provided for each disc 1. The discs are supported for rotation by a shaft 2 and journaled thereto by precision high speed anti-friction bearings 126.

This system provides faster access to any image because actuating a selected motor 55 eliminates the time needed to move a rotational drive from disc to disc, and a disc previously positioned to access a particular frame can simultaneously be rotated to the clear window position.

Figure 12:
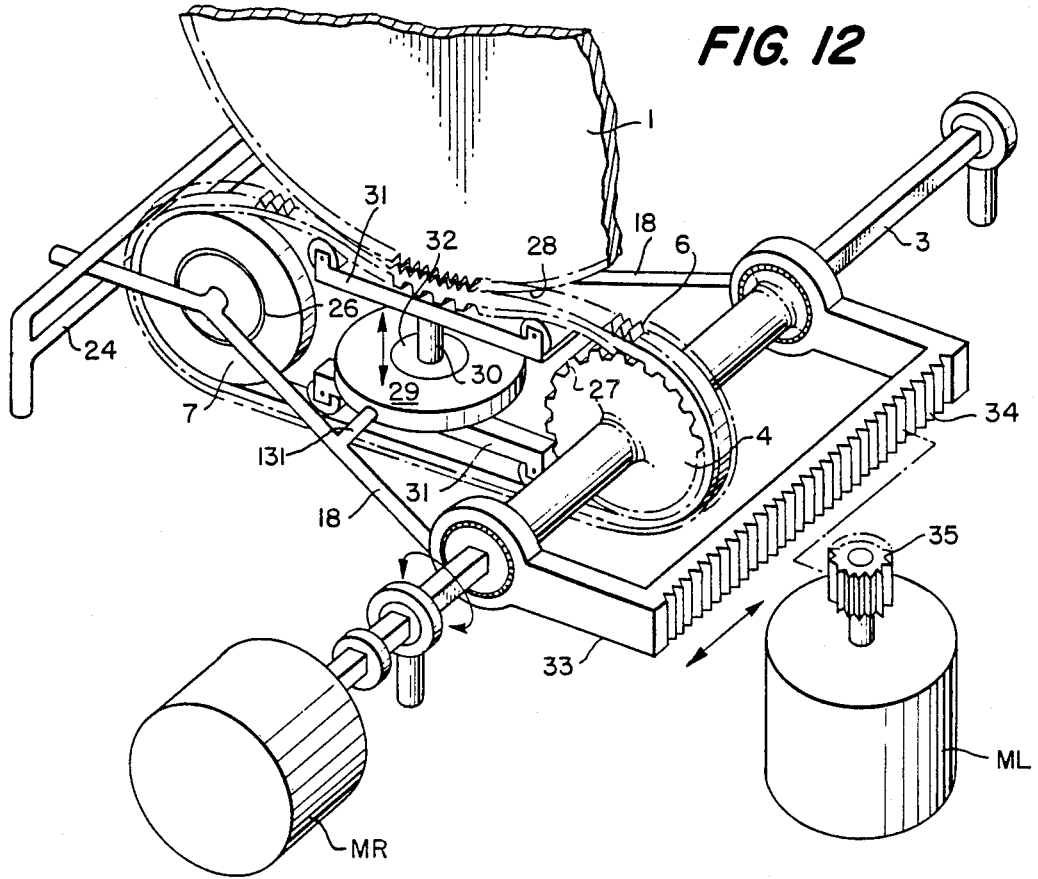

The window 127 shown in this particular embodiment is very narrow since it must pass only a read/write laser beam in optical date disc applications, The disc/radial selection mechanism was explained operationally in the description of the preferred embodiment. FIG. 12 provides an unobstructed view of the mechanism, which is now described structurally in greater detail.

In this embodiment, the bars 24 are fixed and not mounted for movement. Idler pulley 7 is carried by a bearing 26 mounted on the bight of the substantially U-shaped member 18. The drive pulley 4 carries teeth 27 which engage similar teeth on the inner surface of the belt 6; the outer surface of the belt 6 is notched to engage mating teeth 28 on the perimeter of the disc 1. To move the belt into engagement with the teeth 28 and to tension the belt, a clutch means indicated generally at 29 is disposed between the inner runs of belt 6 not engaging the pulleys 4 and 7. The clutch means 29 is comprised of vertical movement apparatus having a shaft 30 mounted for vertical movement.

The upper end of the shaft 30 carries a U-shaped member 31. The upwardly extended portions of the member 31 have rotatably mounted thereon notched pulleys which engage the teeth in the lower surface of the upper run of the belt.

The middle of the shaft 30 is operatively connected to the lifting means 32, which may be a voice coil solenoid, which on its lower portion carries a second U-shaped member 31, which has downwardly extended leg portions which carry similar pulleys engaging the upper surface of the lower run of the belt. The lifting means 32 is supported and maintained in position by legs 131 attached to member 18.

For accomplishing linear motion (disc selection), a U-shaped member 33 attached to and extended in the opposite direction from the member 18 is employed. The bight of the U extending parallel to the axis of the keyed shaft 3 comprises on its outer side a rack 34 which engages pinion 35 carried by motor ML. When the motor ML is activated, the pinion 35 rotates to move the rack and associated structure in the desired direction to position the belt 6 adjacent the selected disc 1.

To accomplish rotational motion (radial selection), the belt raising apparatus 29 is then activated to place the belt in meshing engagement with the teeth of disc 1 and motor MR rotates the belt 6 by means of keyed shaft 3 and drive pulley 4 until the selected image on the disc is in the proper aligned position.

Figure 7:
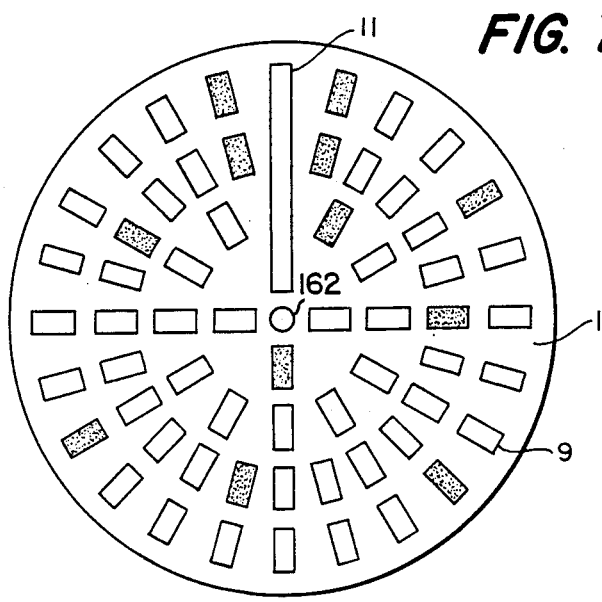
FIG. 7 is a view of a single windowed disc.

FIG. 7 illustrates schematically how the formatting principle of the discs 1 strikes a balance between maximizing the number of images per disc surface and simplifying the mechanism used to retrieve them. The discs 1 have a central opening 162 for receiving shaft 2.

The images 9 are carried in rectangular cells arranged concentrically along the radii of the substantially circular disc.

In microfiche, the rectangular images are stored in a rectangular format which utilizes the space on each individual film card to best advantage to store the largest possible number of images. However, microfiche retrieval devices require each fiche to be moved from a storage position to an active viewing position, thereby increasing the total space needed for retrieval. Also, in the typical fiche arrangement utilizing a single optical axis, the active viewing area (a microfiche reader platen) must be nearly four times the fiche area.

In the disc 1 of the present invention a clear window 11 is provided which when aligned with the clear window of similar discs provides a clear path for the optical axis whereby the selected image may be retrieved. As a result, the find and file operation of the image is accomplished by rotating a selected disc in place whereby no additional retrieval space is required and the stack density may be substantially increased while the time for retrieval is dramatically decreased. Positioning the images on radii of the disc and limiting the number of radial positions the retrieval mechanism must address allows the use of inexpensive stepper motors and open-loop controllers. If the concentration on each concentric ring is increased without regard to discrete radial positions, the expense and sophistication of the radial positioning drive increases without substantial increase in the number of images stored and the speed of retrieval.

Figure 3:
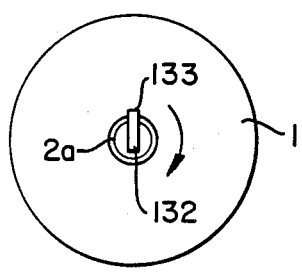
FIG. 3 illustrates schematically a center support, center drive element for rotating the window discs.
Figure 4:
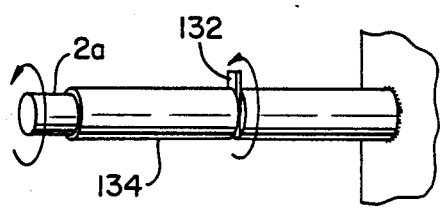
FIGS. 4 and 5 illustrate a stationary and moving key assembly respectively for a center drive assembly.
Figure 5:
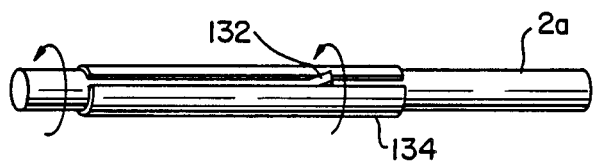

In FIG. 3 another embodiment is presented which consists of a center support/center drive means. In this embodiment the discs 1 are supported on a shaft 2a, a key 132 is mounted on the shaft for engagement with a notch 133 in an opening in a selected disc. Interposed between the shaft 2a and the stack of discs 1 is a tubular member 134. Two embodiments are illustrated, one is that of FIG. 4 in which the key 132 is stationary relative to the sleeve or tubular member 134 and the stack of discs 1 moves axially of shaft 2a until the key 132 engages the notch in the selected disc. In FIG. 5 the key and sleeve 134 are moveable axially of the shaft 2a and the discs remain stationary while the key moves to engage the selected notch.

To describe modifications of the disc/radial selection mechanism illustrated in FIGS. 1 and 12 reference is made to FIGS. 6-11.

Figure 6:
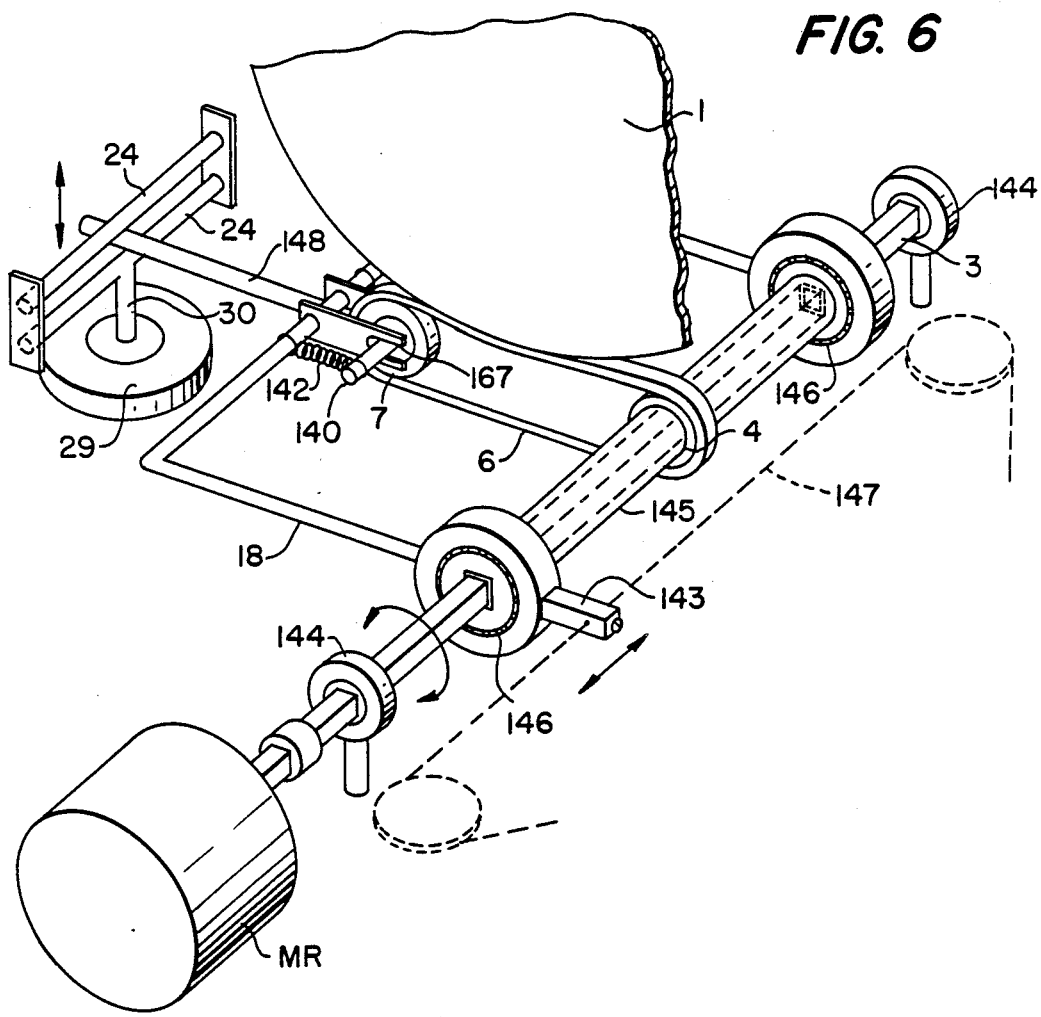
FIGS. 6, 8 and 9 illustrate in detail various embodiments of the disc and radial select mechanisms which involve perimeter drives.

In the embodiment illustrated in FIG. 6 a shaft 3, rectangular in section, rotates the pulley 4 which carries a belt 6 which is also trained over idler pulley 7, that is rotably mounted on shaft 140, which is journaled into bearing slots 167, tension being maintained on the belt by spring 142.

The belt 6, pulleys 4 and 7, etc. are carried by a support assembly comprised of a substantially U-shaped member 18 to which the bearing members 167 are rigidly mounted, the leg portions of the member 18 are attached to an assembly 143 mounted for linear axial movement relative to the shaft 3. The shaft 3 is mounted for rotation in and supported by bracket bearing members 144 at each end thereof and is connected to a motor MR for rotation in a clockwise or counter clockwise direction.

The assembly 143 comprises a sleeve 145 carrying the pulley 4 and is rotatable with the shaft 3. At each end of the sleeve are bearings 146 supporting the end of the legs of the U-shaped member 18 and permitting the rotation of the pulley and sleeve by the shaft 3 relative to the member 18. To move the member 18 and associated structure axially of the shaft 3 is a pulley and belt arrangement 147 shown in phantom lines and operated by a motor (not shown) in either axial direction.

The bight portion of the member 18 is connected to a guide and lift apparatus comprised on a bar 148 rigidly connected to the central portion of the bight of the U-shaped member 18 and slideably mounted between two vertically spaced elements 24 for linear movement relative thereto.

The lower element 24 is connected at its central portion to a vertical shaft 30 which is moved vertically and is part of an elevator mechanism 32 which raises or lowers the belt 6 and associated structure so that the belt is placed in driving contact with the perimeter of the disc 1.

Figure 8:
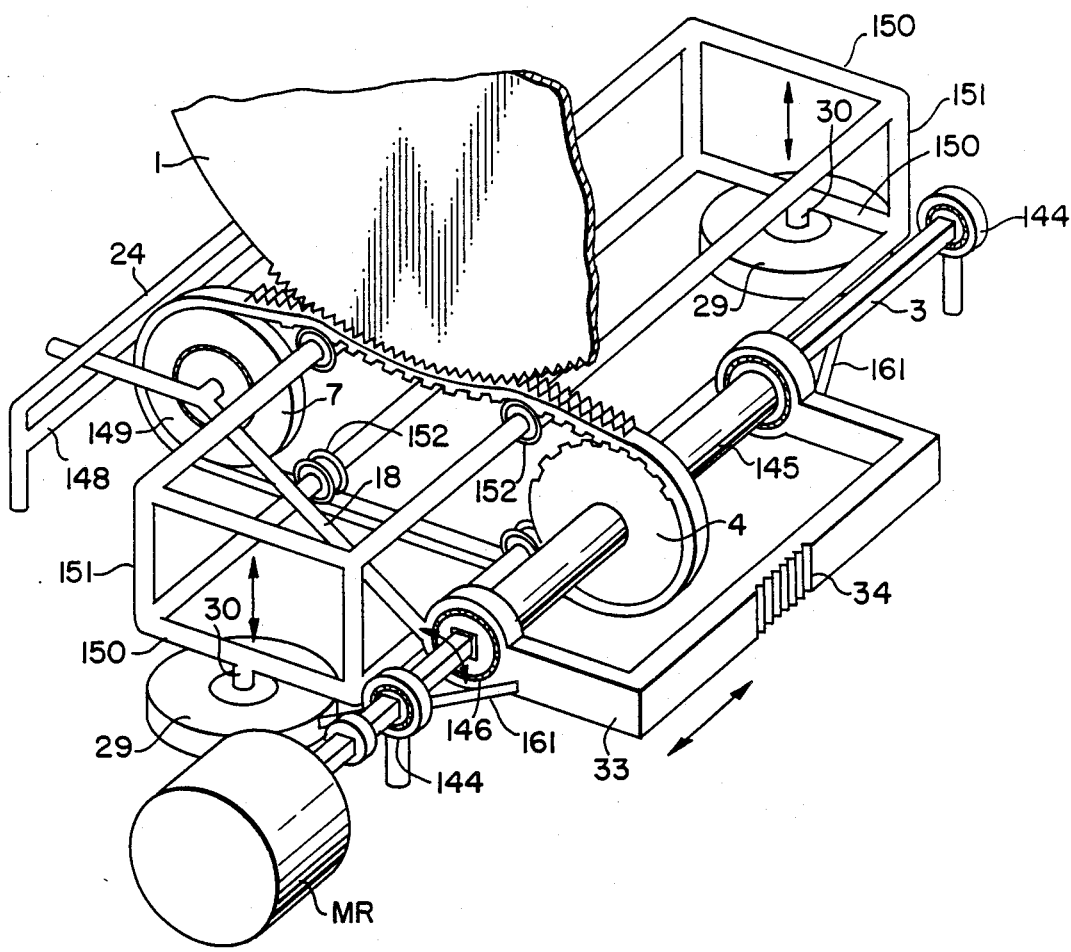

The modification illustrated in FIG. 8 is similar to that previously described embodiment shown in FIG. 12 except that the radial selection device includes a belt tensioning and lift means which is mounted in part exteriorly of the belt 6 instead of between the belt runs.

Expressly it has upper and lower rectangular shaped members 150 held in vertically spaced relationship by uprights 151.

Each of the legs of the rectangular members 150 extends between the runs of the belt 6 and axially moveable and rotatably mounted on the end of each leg is a pulley 152. Each of the lower elements 150 is connected to a shaft 30 by a plurality of lift means indicated generally at 32 so that when the lift means is activated the belt 6 engages the periphery of the disc for rotation of the disc to bring the selected image into alignment. The support 29 for the lift means is connected to the member 33 by struts 161.

Figure 9:
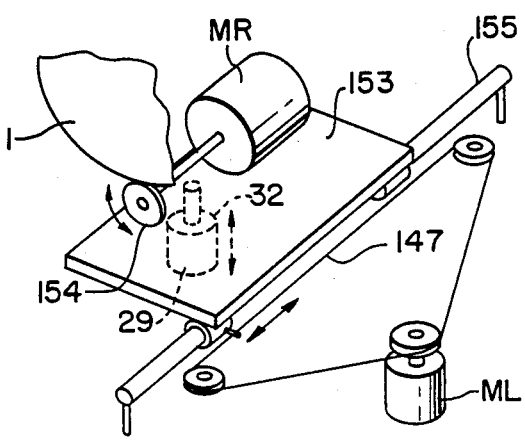

The modification illustrated in FIG. 9 differs from those previously discussed by mounting the motor MR on the linearly movable carriage 153 and rotationally driving the disc 1 by a friction puck 154 mounted on the shaft of the motor MR. In this instance the apparatus is more compact. The lift means 32 operates directly to the carriage 153 to bring the puck into engagement with the disc 1.

The carriage 153 is moved in a linear mode on a shaft 155 by a pulley and belt arrangement similar to that used in the structure illustrated in FIG. 6.

Figure 10:
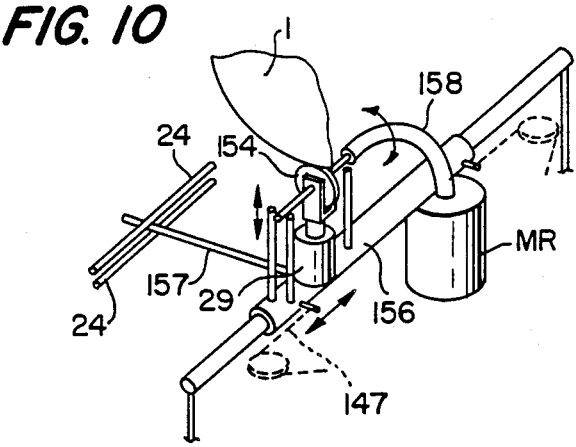
FIGS. 10, 11 and 12 are perspective views of the components which are used to provide combined rotational and linear motion to the disc and radial select mechanisms.

The embodiment illustrated in FIG. 10 discloses a carriage comprised of a sleeve 156 mounted for linear motion on the shaft and having a radially extended bar 157 guided between spaced parallel bars 24. The lift mechanism 29 is mounted on the sleeve 156 to move a puck 154 into contact with the disc 1. The motor MR is also mounted on sleeve 156 and drives the puck 154 by means of flexible shafting 158. Linear motion is imparted to the sleeve 156 by a pulley and belt arrangement 147.

Figure 11:
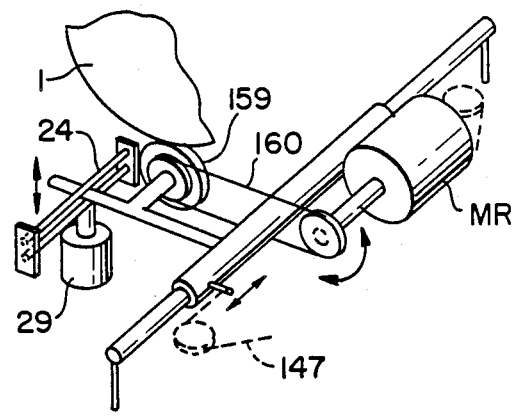

Another embodiment in which the motor MR is carried by a linearly moveable carriage is illustrated in FIG. 11. In this particular instance the puck 159 is driven by belt 160 and the motor MR, which is mounted on the sleeve. The lift mechanism similar to that disclosed in FIG. 6 is comprised of spaced bars 24, a vertical shaft and power means.

Disclosed herein are the apparatus and process for the rapid access retrieval of micrographic and data images stored on windowed discs. It is pointed out that the apparatus and process simplify access to and reduce the time to "find" a specific image and to return the image bearing disc to a "file" position in a stack of discs. It also provides for ready access to a stack of discs.

Since various modifications within the spirit of the invention may occur to those skilled in the art, it is intended that no limitation be placed on the invention except as defined by the scope of the appended claims.

I claim:

1. An apparatus for random access retrieval of micrographic and data images stored along radii of stacked windowed discs, each disc having a closed perimeter, a central opening and a radially disposed clear window, said apparatus comprising: a selection means for addressing a particular disc carrying desired information while the disc remains in the stack; an optical system comprising projecting means at one end of said stack of discs for projecting a light along an optical axis through the clear windows of a stack of discs to an image receiving means at the opposite end of the stack; means for radially moving said optical system thereby moving said optical axis; means for rotating a selected disc to a position wherein the selected image is in the optical axis of said system, said means being fixed to and moveable with said selection means and including a drive portion and means for moving said drive portion radially into driving engagement with the closed perimeter of the selected disc and means for supporting said stack of discs for rotation, said means comprising a supporting shaft adapted to pass centrally through a stack of discs.

2. An apparatus for random access retrieval of micrographic and data images stored along radii of stacked windowed discs, each disc having a closed perimeter, a central opening and a radially disposed clear window, said apparatus comprising: a selection means for addressing a particular disc carrying desired information while the disc remains in the stack; an optical system comprising projecting means at one end of said stack of discs for projecting a light along an optical axis through the clear windows of a stack of discs to an image receiving means at the opposite end of the stack; means for radially moving said optical system thereby moving said optical axis; means for rotating a selected disc to a position wherein the selected image is in the optical axis of said system and means for supporting said stack of discs for rotation, said means comprising a supporting shaft adapted to pass centrally through a stack of discs and the means for selecting the disc comprises a frame like member, a second shaft supporting said member for linear movement and a means for moving said frame along a longitudinal axis of said second shaft parallel to an axis passing at right angles to the diameter of a stack of discs and to the longitudinal axis of said supporting shaft.

3. The combination of claim 2 in which the means for rotating the disc comprise rotatable drive means coupled to an apparatus for selectively moving the rotatable means into engagement with a perimeter of a disc said drive means and apparatus being fixed to and moveable with the frame like member.

4. An apparatus for selecting and rotating a disc in a system for random-access retrieval of micrographic and data images comprising a shaft rotatably carried by spaced brackets on a chassis, means for rotating said shaft in said brackets, a framework slidably mounted on said shaft, means preventing rotation of said framework with said shaft and means for moving said framework longitudinally of said shaft, said framework carrying a drive means, means connecting a portion of said drive means to said shaft for rotation therewith, means selectively moving said drive means into engagement with the perimeter of a selected disc whereby rotation of a disc places a desired image in a position for alignment with an optical axis, a supporting shaft adapted to pass centrally through a stack of discs and support the discs in the stack for individual rotation relative to the shaft and other discs in the stack.

5. An apparatus for selecting and rotating a disc bearing micrographic or data images and a radially disposed clear window from similar discs stacked therewith, comprising a support shaft, a means for mounting a stack of discs for rotation relative to said shaft, a plurality of reversible motors, each motor having a drive means mounted for engagement with a disc perimeter, a motor when activated adapted to rotate a single disc to a find position, means for simultaneously activating other motors to rotate other discs to a file position with their clear windows aligned with a selected image in a find position whereby a selected image may be projected by optical means through the aligned clear windows.

6. A disc/radial selection apparatus for selecting a disc from a stack of similar windowed discs and a particular micrographic or data image stored on a radius of a selected disc; comprising an elongated shaft having a longitudinal axis at right angles to a diameter of the disc, a frame slidably mounted for linear motion on said shaft, means facilitating rotation of the shaft relative to the frame, means for preventing rotative movement of said frame relative to the shaft, means carried by said frame for cooperation with a drive means to move the frame linearly along said shaft to a position adjacent the selected disc and means operatively secured to said shaft for rotating the shaft; a drive means secured to said shaft for rotation thereby, and means for selectively moving said drive means into engagement with the perimeter of a selected disc to thereby rotate the disc to a position whereby the radius carrying the selected image is in a find position.

7. The selection apparatus of claim 6 wherein the means facilitating rotation of said shaft are spaced apart supporting bearing brackets and the frame includes a substantially U-shaped member, said means to move the frame linearly comprises a rack secured to the bight of the member for engagement with a pinion on an associated driving element.

8. The selection apparatus of claim 7 wherein the means for preventing rotative movement of said frame and the means for rotating a disc comprises; rigid arms attached to the legs of said U-shaped member and having an outwardly projected portion which lies between two horizontally disposed rails which are held in vertically spaced relationship by legs attached to a chassis thereby precluding rotation but permitting linear motion, the ends of said arms being connected by a shaft journaled in an idler pulley, a drive pulley connected for rotation with said shaft, a belt trained over said pulleys, said frame having a clutch or elevator mechanism attached thereto and extended between the runs of said belt, said mechanism having idler pulleys running on upper and lower runs of said belt whereby when the elevator or clutch is actuated the distance between the pulleys is increased and the upper run of the belt is extended into engagement with the perimeter of a selected disc thereby rotating the disc to a desired position.

9. The selection apparatus of claim 8 wherein the clutch or elevator mechanism is attached to and between the two rigid arms between the drive pulleys and idler pulley carried by said arms.

10. The selection apparatus of claim 8 wherein the support for the clutch or elevator mechanism comprises two rectangular frames secured by four corner members in vertically spaced relation, the rectangular frames each having an idler pulley rotatably mounted on their longest side elements to engage the upper and lower runs respectively of the belt, struts secured to the legs of the U-shaped member and supporting the clutch or elevator mechanism in engagement with the ends of the lower rectangular frame member, whereby when the clutch is actuated the idler pulleys on the upper frame are placed in contact with the upper run of the belt which is moved into driving relationship with to the perimeter of the selected disc.

11. A disc/radial selection apparatus for selecting a disc from a stack of similar windowed discs and a particular micrographic or data image located on a radius thereof; comprising an elongated shaft having a longitudinal axis at right angles to a diameter of the stack of discs, a frame slidably mounted linear motion on said shaft, means carried by said frame for cooperation with a drive means to move the frame linearly along said shaft to a position adjacent a selected disc, a drive element carried by said frame, means for selectively moving said drive element into driving relationship with the perimeter of a selected disc to rotate the disc to place the selected image into a viewing position.

12. The selection apparatus of claim 11 in which the drive element comprises a belt trained over an idler and a driven pulley, the frame being substantially rectangular in shape, one side of the rectangle being slidably mounted on said shaft, said driven pulley being mounted on said one side for rotation by shaft, the opposite side carrying spaced slotted bearing means and carrying a stub pintle upon which the idler pulley is mounted, spring means connected between said pintle and said opposite side to maintain tension on said belt, a bar extended from said opposite side away from the slotted bearing, the end portion of said bar being received between vertical, spaced elongated rods, the elongated rods being held in spaced relation by rigid connecting means at their ends, elevator means connected to said lower rod, whereby when said elevator means is actuated the frame is tilted to place the belt in contact with the perimeter of a selected disc.

13. The selection apparatus of claim 11 in which the frame comprises a rectangular member slidably attached to said shaft by spaced sleeves through which the shaft is extended, said drive element comprised of a puck mounted on the shaft of a motor supported by said frame, mounted beneath said frame is an elevator means which when actuated tilts the frame to place the puck in contact with the perimeter of a selected disc.

14. The disc/radial selection apparatus of claim 11 in which the frame comprises a tubular member mounted on the shaft and a bar extended at right angles to said tubular member, the end of said bar received between vertically spaced parallel rods, attached to said frame is an elevator means, guide means are attached to said tubular member on each side of said elevator means, bearing means mounted on the upper end of said elevator means, a drive shaft carried in said bearing means, portions of said drive shaft guided by said guide means, a puck carried by said drive shaft whereby when the elevator is raised the puck contacts the perimeter of a selected disc, a motor mounted on said frame, a flexible shaft connecting the motor to said drive shaft whereby the motor drives the puck.

15. The disc/radial selection means of claim 11 in which the frame comprises a tubular member mounted on the shaft and a bar extended at right angles to said tubular member, the end of said bar received between vertically spaced parallel, the rods being held in spaced relation by rigid connecting means at their ends, elevator means connected to said lower rod, whereby when the elevator is raised the frame tilts, a second bar extended at right angles to said first bar, a driven pulley and puck journalled on said second bar, a motor and driving pulley mounted on said frame, a belt trained over said pulleys to drive said puck whereby when said frame is tilted the puck contacts the perimeter of a selected disc.

16. An apparatus for random access retrieval of micrographic and data images stored along radii of stacked windowed discs, each disc having a closed perimeter and a radially disposed clear window, said apparatus comprising: means for rotatably supporting a stack of discs; a selection means for addressing a particular disc carrying desired information while the disc remains in the stack; an optical system comprising projecting means at one end of a stack of discs for projecting a light along an optical axis through the clear windows of a stack of discs to an image receiving means at the opposite end of the stack; means for radially moving said optical system thereby moving said optical axis; and means contacting the closed perimeter for rotating the disc to a position wherein the selected image is in the optical axis of said system said means for contracting said closed perimeter being fixed to and moveable with said selection means.

17. The combination of claim 2 in which the means for rotating the disc comprises rotatable drive means coupled to said supporting shaft for selectively engaging the center of a disc bearing the selected image.

* * * * *